US008125519B2

(12) United States Patent

Haug

(10) Patent No.: US 8,125,519 B2

(45) Date of Patent: Feb. 28, 2012

(54) NIGHT VISION DEVICE FOR MOTOR VEHICLES

(75) Inventor: Karsten Haug, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1246 days.

(21) Appl. No.: 11/628,616

(22) PCT Filed: Apr. 5, 2005

(86) PCT No.: PCT/EP2005/051518

§ 371 (c)(1), (2), (4) Date: Jul. 30, 2007

(87) PCT Pub. No.: WO2005/119623

PCT Pub. Date: Dec. 15, 2005

(65) Prior Publication Data

US 2007/0291113 A1 Dec. 20, 2007

(30) Foreign Application Priority Data

Jun. 2, 2004 (DE) ........................ 10 2004 026 847

(51) Int. Cl.
*H04N 7/18* (2006.01)
*G06F 15/16* (2006.01)

(52) U.S. Cl. ........................................................ 348/118

(58) Field of Classification Search ........... 348/116–119
See application file for complete search history.

(56) References Cited

U.S. PATENT DOCUMENTS

| | | | | |
|---|---|---|---|---|
| 6,556,905 | B1 * | 4/2003 | Mittelsteadt et al. | 701/35 |
| 6,864,784 | B1 * | 3/2005 | Loeb | 340/441 |
| 2004/0257442 | A1 * | 12/2004 | Eggers et al. | 348/148 |
| 2005/0072921 | A1 * | 4/2005 | Moisel et al. | 250/330 |
| 2005/0073581 | A1 * | 4/2005 | Moisel et al. | 348/148 |
| 2006/0095190 | A1 * | 5/2006 | Currie | 701/79 |

FOREIGN PATENT DOCUMENTS

| | | |
|---|---|---|
| DE | 101 31 720 | 1/2003 |
| JP | 2001 150977 | 6/2001 |
| WO | 02 36389 | 5/2002 |
| WO | 03 064213 | 8/2003 |

* cited by examiner

*Primary Examiner* — Zarni Maung

(74) *Attorney, Agent, or Firm* — Kenyon & Kenyon LLP

(57) ABSTRACT

A night vision device for motor vehicles, having a display unit for depicting the vehicle surroundings imaged with at least one night vision sensor, has a control unit for ascertaining, from the current driving situation, a value for the risk potential as a result of the night vision device, which value is influenced at least by the vehicle speed; and switching off the night vision device if the risk potential value exceeds a defined limit value.

12 Claims, 1 Drawing Sheet

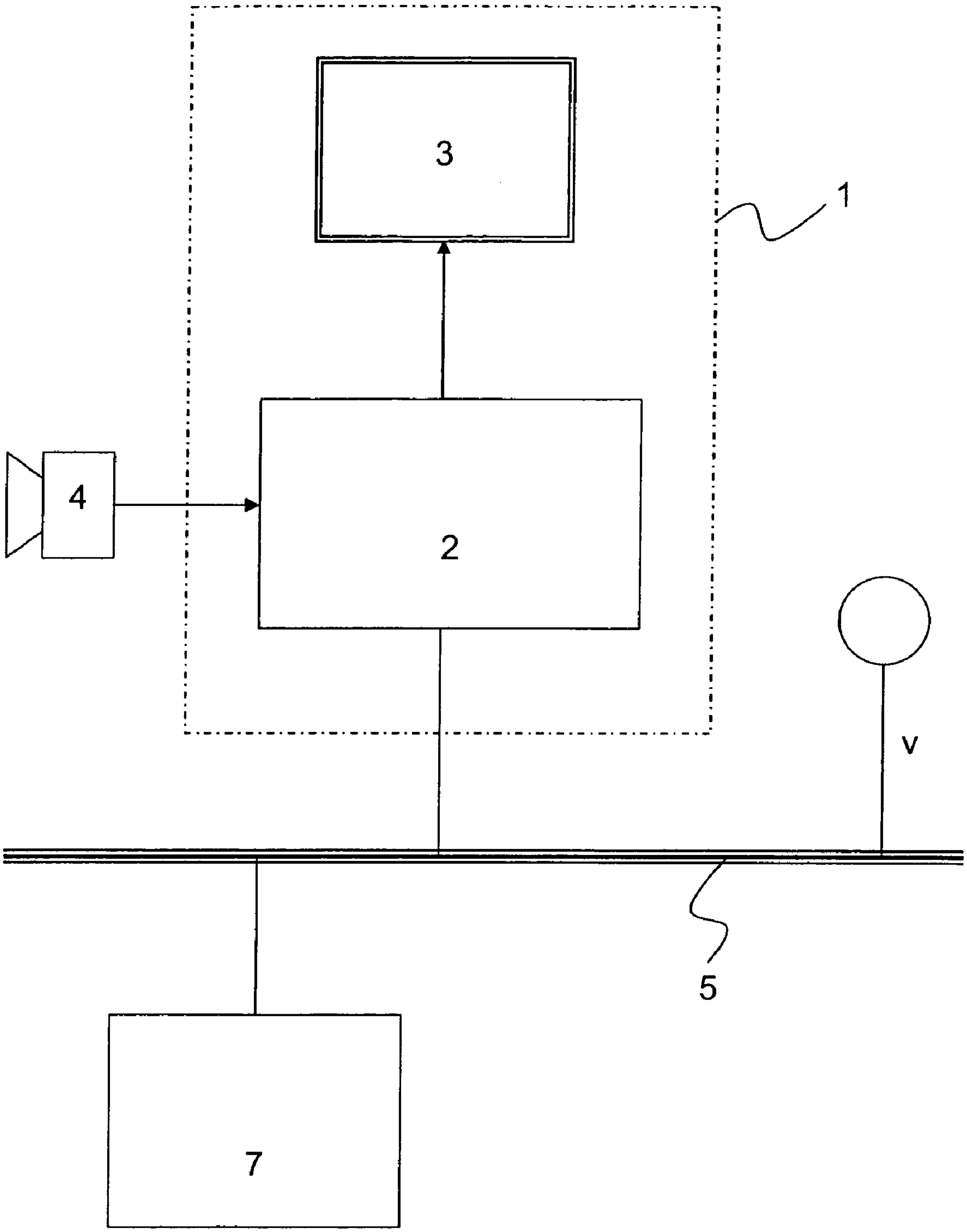
3
1
4
2
V
5
7

NIGHT VISION DEVICE FOR MOTOR VEHICLES

FIELD OF THE INVENTION

The present invention relates to a night vision device for motor vehicles, having a display unit for depicting the vehicle surroundings imaged with at least one night vision sensor.

BACKGROUND INFORMATION

Night vision devices for motor vehicles are well known, for example from PCT Published International Application No. 02/36389. They have night vision sensors that acquire an image of the vehicle surroundings, for example based on near infrared with active illumination (NIR) or based on thermal radiation (FIR), with a visual range that as a rule exceeds the visual range of the human eye. The image of the vehicle surroundings is presented to the driver via a display unit. The display unit can be a conventional display in the dashboard or a head-up display that projects the image onto the windshield by way of a projector. Head-up projectors are known, for example, from German Published Patent Application No. 101 31 720.

United States Patent Application No. 2002 0070852 describes a display control system for motor vehicles that enhances the driver's safety when the vehicle is in motion. The system monitors the vehicle's state and activates or deactivates various system components, such as microphones, loudspeakers, displays, and input devices.

With night vision devices in motor vehicles, the particular problem arises that while on the one hand driving safety is improved by the greater visual range, on the other hand a night vision device also represents a risk potential.

SUMMARY OF THE INVENTION

It is therefore the object of the invention to create an improved night vision device for motor vehicles having a display unit for depicting the vehicle surroundings imaged with at least one night vision sensor.

The object is achieved according to the present invention, with the night vision device of the species, in that the night vision device has a control unit for ascertaining, from the current driving situation, a value for the risk potential as a result of the night vision device, which value is influenced at least by the vehicle speed. The night vision device is switched off if the risk potential value exceeds a defined limit value.

It is therefore proposed to switch off the night vision device in controlled fashion at least as a function of the vehicle speed as a parameter for the risk potential value. This prevents the night vision device from being misused, as a result of the greater visual range obtained, by a driver who is misled into driving improperly fast.

Parameters for ascertaining the risk potential value can also be the steering wheel input, vehicle motion, road layout, meteorological parameters (ice, snow, temperature, etc.), rain sensor signals, time-of-day information, light status (low- and/or high-beam lights switched on), current visual range, availability of night vision infrared headlights, or the like. Parameters can also be indices for determining the attention status of the driver, which can be obtained, for example, via an analysis of acceleration, braking, and steering behavior or via an analysis of eye movements using an interior camera.

An immediate deactivation of the night vision device as soon as the risk potential value exceeds the defined limit value should be avoided. It is instead advantageous first to output a warning notification, acoustically and/or optically, as soon as a limit value exceedance of this kind has been identified. A delayed deactivation of the night vision device is then effected if, after a defined waiting time, the risk potential value is still greater than the defined limit value, i.e. if the risk potential has not decreased.

It is also advantageous if, in an intermediate phase, the night vision device is embodied to output a warning notification, optically and/or acoustically, if the risk potential value exceeds a further defined limit value but is still lower than the first defined limit value. The driver can thereby be warned in advance so that an elevated risk can be prevented in timely fashion.

The defined limit value is preferably defined variably as a function of beneficial effect parameters, for example the visual range. The risk potential is thus evaluated in proportion to the beneficial effect of the night vision device, and not in absolute fashion.

In special cases when the night-vision device has no benefit at all, for example in during the day in good weather and with good road conditions, the night vision device can thus be prevented from switching on in the first place.

Deactivation of the night vision device is accomplished preferably by stepwise or continuous reduction of the night vision display on the display unit. Optionally, however, the display can also first blink, or can be blanked out in portions, for example from top to bottom. Only then is complete deactivation accomplished, first of the night vision display and then of the night vision device itself.

It is particularly advantageous if the night vision device has an interface to a navigation device in order to transfer data for ascertaining the risk potential, in particular road layout information and/or meteorological parameters, from the navigation device to the night vision device. Parameters of the navigation device are thus also utilized to ascertain the risk potential value.

A radio interface to warning beacons in the road area can furthermore optionally be provided in the night vision device, in order to transfer from the warning beacons data for ascertaining the risk potential. Transponders that are, for example, set up by the roadside or recessed into the road can thus be installed in order to transmit warning signals about, for example, upcoming sharp curves.

It is also particularly advantageous if the control unit of the night vision device is embodied to deactivate further assistance devices in the motor vehicle, for example adaptive cruise control (ACC) or lane-keeping support devices, as a function of the risk potential value. The risk potential ascertained in order to switch off the night vision device can thus also be utilized for other purposes.

Conversely, information from further assistance devices can also be incorporated into the warning and deactivation strategy. For example, a deactivation of the night-vision device is possible when an adaptive cruise control (ACC) device has detected a preceding vehicle within range of the low-beam lights.

BRIEF DESCRIPTION OF THE DRAWING

The FIGURE shows a block diagram of a night vision device for motor vehicles.

DETAILED DESCRIPTION

FIG. 1 depicts a block diagram of a night vision device 1 according to the present invention which has a preferably programmable control unit 2 having a microprocessor, to which unit a display unit 3, for depicting the night vision image acquired with at least one night vision sensor, is connected in conventional fashion.

Night vision sensor 4 can be a conventional sensor device based on near infrared with active illumination (NIR), or based on thermal radiation (FIR).

Display unit 3 can be a conventional display or a head-up projector or the like.

A night vision device 1 of this kind can be hazardous if the driver, in critical driving situations, pays attention exclusively or predominantly to display unit 3 rather than observing the road scene directly through the windshield of the motor vehicle. A driving situation becomes critical, inter alia, when the speed v of the motor vehicle is not adapted to driving in consideration of the displayed night vision image.

Control unit 2 is therefore preferably coupled via a data bus 5 in the vehicle, e.g. a CAN bus, to a speed sensor 6. From speed sensor 6, the speed v is conveyed into the control unit as a parameter for calculating a risk potential value.

Further parameters, which are conveyed e.g. via data bus 5 but also, optionally, directly into control unit 2, can also be taken into account in ascertaining a risk potential value that represents the hazardousness of the instantaneous driving situation in terms of the utilization of night vision device 1. It can also be critical to drive on a curving road at a speed for which the visual range of night vision device 1 on straight stretches would be sufficient, but that is too high for driving with night vision device 1 because of the complex road layout. The information regarding the road layout can be extracted from a navigation device 7. With this it is also possible to take into account critical road conditions that are not yet within the visual range of night vision sensor 4 (e.g. curves behind a hill).

The specific meteorological situation, for example glaze ice at the next curve, could also be a parameter for calculation of the risk potential value, which parameter can be supplied, for example, by a navigation device 7.

The parameters extracted by navigation device 7 can, for example, be read out from a data medium available in the vehicle, or obtained online from a central station by radio communication.

Further parameters for calculating the risk potential value can be:

- the steering wheel input or vehicle motion (made available by way of a vehicle dynamics control system or electronic stability program [ESP]);
- rain, ascertained e.g. by way of an integrated rain sensor;
- parameters regarding the driver's attention state, obtained e.g. via an analysis of acceleration, braking, and steering behavior or via an analysis of eye movements using an interior camera;
- information regarding time of day, e.g. by linking a clock to control unit 2;
- light status, which can be ascertained e.g. by way of a light sensor;
- the current visual range, which can be calculated, for example, by way of an evaluation unit integrated into night vision device 1;
- stationary warning beacons installed in the region of the road, which communicate with the vehicle via radio and deliver warning parameters;
- the state of availability of the infrared headlights of night vision sensor 4 (headlights defective, headlights not activatable due to persons in the vicinity, or the like);
- tire pressure, measured e.g. with a tire pressure sensor.

Control unit 2 is now embodied, for example by programming, in such a way that the night vision mode is deactivated, in a manner comprehensible to the driver, if the risk potential exceeds the benefits of night vision device 1.

For this purpose, the risk potential value is calculated by control unit 2 as a function of the vehicle speed v and, if applicable, further parameters cited above, and compared with a defined limit value.

In addition to the necessary processing of additional information by the driver, who must comprehend both the real image and the night vision image when the head-up display is in the correct location, the risk arising from night vision device 1 also results from looking at display unit 3 in the wrong direction, instead of looking directly at the road. This is particularly the case, for example, in sharp curves that are only partly sensed by night vision device 1, or for animals or pedestrians approaching the vehicle from the side in the close-in lateral region that is sensed in only limited fashion by night-vision device 1.

In a preferred embodiment, the risk potential value is divided into at least three risk levels.

If no risk exists as a result of the operation of night vision device 1 (degree of risk=0), night vision device 1 can be activated without restriction and remains active after an activation.

If the degree of risk deteriorates, for example because of an increase in speed, a greater curvature of curves, a decrease in outside temperature, etc., a variety of staged strategies are applied.

At a degree of risk of 1, the beneficial effect of the operation of night vision device 1 still exceeds the risk potential, for example when driving at a speed somewhat too high for the available night vision visual range. The night vision function then remains active, but an additional notification is given on display unit 3 that, for example, the speed is too high. This notification is preferably labeled in color.

If the night vision visual range that is available permits a speed of 50 km/h with complete availability of a safety margin, a degree of risk of 1 is assumed to exist for a speed of more than 59 km/h.

In the event the risk potential equals or exceeds the beneficial effect of night vision device 1, a degree of risk of two is assumed to exist. This is the case, for example, when driving at a definitely excessive speed for which the visual range of night vision device 1 is no longer sufficient.

A substantial speed exceedance of this kind would exist, for example, if the vehicle has a speed of 75 km/h but the night vision device can display to the driver only a region in front of the vehicle that guarantees safe travel at a speed of no more than 50 km/h.

The speed that is safe in each case depends on the current visual capabilities, but also on the type of road being traveled, i.e. the road class or road layout. The speed values indicated above are therefore to be viewed as only examples for a specific situation. The speed limits can shift upward or downward depending on the corresponding situation.

If the visual range of the night vision device is no longer sufficient, then firstly a warning is overlaid citing the cause of the warning, and announcing that the night vision image will be deactivated within a defined switch-off time (e.g. 10 seconds). The warning should likewise be labeled in color, preferably in red letters.

Deactivation should be effected only with a delay, since the driver must be given the opportunity to decrease his speed in controlled fashion with the aid of the night vision image. An immediate deactivation could be disastrous, since the visual range then drops abruptly from the visual range increased by the night vision image to the visual range with low-beam headlights, for example from 150 m to 50 m.

Only if the driver does not react to the warning is the night vision image deactivated, stepwise or continuously, after the defined switch-off time. The night vision image can also fade slowly or can be blanked out from top to bottom, so that the visual range for the driver is reduced quasi-continuously.

Optionally, the displayed night vision image can also blink; the blink frequency can be variable as a function of the still-current risk potential or of the switch-off time. For example, the night vision image can be displayed so that it initially blinks slowly and then blinks increasingly quickly, before the night vision image is finally switched off.

For a degree of risk of two, an activation of the night vision device, if it is not already activated, is also prevented. The driver is then informed via a short message, for example, that the speed is too high for night vision mode.

The degree of risk can likewise be set to a value of 2 if it is discovered that the night vision function is being activated purely frivolously, for example during the day when the vehicle is in motion and not in a diagnostic mode.

For a degree of risk of one, an activation of night vision device 1 is possible, but a notification as to the degree of risk, and the reason for the risk potential, is always overlaid.

Control unit 2 can be connected to further devices for performing automatic functions, in order to deactivate them above a specific risk potential value or degree of risk. Such automatic functions can be implemented, for example, in adaptive cruise control systems or lane-keeping support devices. Here again, a warning should first be generated in order to allow the driver a certain reaction time.

The deactivation of night vision device 1 can be accomplished by the fact that a state machine for the light mode of night vision device 1 is supplemented with corresponding states and transitions.

Night vision device 1 can furthermore be coupled to radio receivers in order to receive radio data, from stationary warning beacons installed by the roadside and having short-range transponders, regarding parameters for calculating the risk potential. Local traffic conditions, for example rain, temperatures below the freezing point that can result in local glaze ice, dangerous sections of road, etc., can thereby be taken into account.

The warning information can be overlaid (destructively or nondestructively) on the night vision image on display unit 3, as an icon at the edge or at the center of the image, in stationary fashion in the image or in moving blinking fashion, or similarly. The warning notifications can also be graduated depending on the severity of the risk. The greater the risk, the larger and more centrally they should be presented on display unit 3. They should then also have a more aggressive color.

What is claimed is:

1. A night vision device for a motor vehicle, comprising:

at least one night vision sensor;

a display unit for depicting vehicle surroundings imaged with the at least one night vision sensor; and a control unit for:

ascertaining, from a current driving situation, a value for a risk potential as a result of an activated state of the display unit, the value being influenced at least by a vehicle speed, and switching off at least the display unit if the risk potential value exceeds a defined limit value.

2. The night vision device as recited in claim 1, wherein:

the control unit outputs a warning notification as soon as the value for the risk potential exceeds the defined limit value, and the control unit switches off the night vision device in delayed fashion if, after a defined waiting time, the value for the risk potential is still greater than the defined limit value.

3. The night vision device as recited in claim 1, wherein:

the control unit ascertains the value for the risk potential as a function of one of a steering wheel motion and at least one of a vehicle motion, a road layout, a meteorological parameter, a rain sensor signal, a parameter regarding an attention status of a driver, a time-of-day information, a light status, a current visual range, and an availability of night vision infrared headlights.

4. The night vision device as recited in claim 1, further comprising:

an interface to a navigation device in order to transfer data for ascertaining the risk potential from the navigation device to the night vision device.

5. The night vision device as recited in claim 4, wherein:

the data for ascertaining the risk potential includes at least one of road layout information and a meteorological parameter.

6. The night vision device as recited in claim 1, further comprising:

a radio interface to warning beacons in a road area for a transfer of data for ascertaining the risk potential.

7. The night vision device as recited in claim 1, further comprising:

an arrangement for outputting a warning notification if the value for the risk potential rises and is lower than the defined limit value.

8. The night vision device as recited in claim 1, wherein:

the control unit variably defines the defined limit value as a function of a beneficial effect parameter including a visual range.

9. The night vision device as recited in claim 8, wherein:

the control unit prevents activation of the night vision device if no beneficial effect of the night vision device for a driver of the motor vehicle has been identified.

10. The night vision device as recited in claim 1, wherein:

the control unit, for deactivation of the night vision device, one of reduces in one of stepwise fashion and continuous fashion, blinks, and blanks out in portions the night vision display on the display unit, and then switches off the night vision device completely.

11. The night vision device as recited in claim 1, wherein:

the control unit deactivates a further assistance device in the motor vehicle as a function of the value for the risk potential.

12. The night vision device as recited in claim 11, wherein the further assistance device includes one of an adaptive cruise control (ACC) system and a lane-keeping support device.

* * * * *